United States Patent [19]

Madic et al.

[11] Patent Number: 5,826,161
[45] Date of Patent: Oct. 20, 1998

[54] PROCESS FOR THE SELECTIVE SEPARATION OF ACTINIDES (III) AND LANTHANIDES (III)

[75] Inventors: Charles Madic, Thiais; Pierre-Yves Cordier, Avignon, both of France

[73] Assignees: Commissariat a l'Energie Atomique, Paris; Compagnie Generale des Matieres Nucleaires, Velizy Villacoublay, both of France

[21] Appl. No.: 856,839

[22] Filed: May 15, 1997

[30] Foreign Application Priority Data

May 24, 1996 [FR] France ................... 96 06488

[51] Int. Cl.$^6$ ...................... B01D 11/04
[52] U.S. Cl. .................. 423/8; 423/9; 423/21.5
[58] Field of Search .................. 423/8, 9, 21.5

[56] References Cited

U.S. PATENT DOCUMENTS

| | | | |
|---|---|---|---|
| 4,496,523 | 1/1985 | Bonnin et al. | 423/9 |
| 4,572,802 | 2/1986 | Hubert et al. | 534/12 |
| 4,770,807 | 9/1988 | Musikas et al. | 252/184 |
| 4,938,871 | 7/1990 | Musikas et al. | 210/634 |
| 5,510,090 | 4/1996 | Cuillerdier et al. | 423/9 |

FOREIGN PATENT DOCUMENTS

| | | | |
|---|---|---|---|
| 0 110 789 | 6/1984 | European Pat. Off. | C22B 3/00 |
| 0 210 928 | 2/1987 | European Pat. Off. | C22B 3/00 |
| WO 93/11113 | 6/1993 | WIPO | C07D 213/81 |

*Primary Examiner*—Ngoclan Mai
*Attorney, Agent, or Firm*—Pearne, Gordon, McCoy & Granger LLP

[57] ABSTRACT

The present invention relates to a process for the selective separation of actinides (III) and lanthanides (III) from a reaction medium containing them. More specifically, the invention permits a selective extraction of actinides (III) by using an aqueous reaction medium containing $TcO_4^-$ pertechnetate ions. The preferred extracting agents are chosen from among picolinamides and their derivatives. A particular use of the process is in the separation of actinides (III) from high activity raffinates produced during the reprocessing of nuclear fuels according to the solvent-based extraction process known as the PUREX process.

10 Claims, No Drawings

PROCESS FOR THE SELECTIVE SEPARATION OF ACTINIDES (III) AND LANTHANIDES (III)

The present invention relates to a process for the selective separation of actinides (III) and lanthanides (III) from a reaction medium containing them, more specifically permitting a selective extraction of actinides (III) using a reaction medium containing $TcO_4^-$ pertechnetate ions.

A particular use of this process is in the separation of actinides (III) from the high activity raffinates produced during the reprocessing of nuclear fuels according to the solvent-based extraction process known as the PUREX process.

The management and control of waste resulting from the reprocessing of fuels from power generating reactors is one of the most difficult problems presently confronting the nuclear industry throughout the world.

One of the most complex problems to be solved is that of the long term harmfulness or noxiousness of such waste, which is linked with the presence in nuclear waste of long life radionuclides, such as e.g. minor actinides: neptunium ($^{237}Np$), americium ($^{241,243}Am$), curium ($^{243-245}Cm$), but also fission products, inter alia technetium ($^{99}Tc$).

One solution to this problem can consist of the separation of such long life radionuclides with a view to:

either their transmutation into short life radionuclides by means of preferably fast neutron nuclear reactors or hybrid systems constituted by a particle accelerator stimulating a subcritical reactor by means of neutrons obtained from a spallation source, or their specific conditioning in solid matrixes ensuring their confinement, e.g. in glass.

These two control strategies are respectively known as separation-transmutation (S-T) or separation-conditioning (S-C). Increased research has taken place in this field since the end of the 1980's, with the launch of the OMEGA program in Japan and the SPIN program in France, linked with the law of Dec. 30, 1991 concerning nuclear waste.

In irradiated nuclear fuel reprocessing installations, in the first stage of uranium and plutonium extraction, normally aqueous solutions of fission products containing relatively large quantities of trivalent ions of the lanthanide and actinide series are obtained. The aqueous effluents from said installations also contain the same ions.

Bearing in mind the relatively long period of actinide elements, great interest is attached to the separation thereof from nitric aqueous solutions in order to avoid the handling of waste or effluents with a high alpha activity. Thus, the presence of long life alpha emitters such as Am, Np and Cm make the waste storage costs high.

Chemical separation methods for Np, Am, Cm and Tc have been studied. The case of the separation of Np and Tc can be considered as relatively simple to solve.

Thus, it is possible to separate these elements during the reprocessing of fuels according to the PUREX process, using TBP diluted in TPH by making simple modifications to this process.

Thus, neptunium can be separated by performing the PUREX process after minor changes to the acidity of the fuel dissolving liquor and/or the temperature of the solutions during the extraction stage (first U-Pu cycle).

Moreover, the technetium existing in irradiated fuel dissolving liquor in the form of $TcO_4^-$ pertechnetate ion, is essentially coextracted by the solvent, firstly with the species Zr(IV) in the form of a mixed complex $Zr(NO_3)_3(TcO_4)(TBP)_n$ and then with the plutonium species (PuIV)) and uranium species (U(VI)).

In order to separate the technetium from the uranium and plutonium, it has been necessary in reprocessing plants to define a so-called Tc washing operation leading to the deextraction of the technetium in an aqueous solution, where said element is quasi-purified. At present, this solution is mixed with the high activity raffinate essentially containing nuclear waste. In conjunction with new S-T or S-C control strategies, it is found that it should be relatively easy to separate technetium.

However, the separation of minor actinides such as Am and C cannot be carried out by the PUREX process. It is therefore a prop ate to define a process specific for this purpose. The major difficulties in this field are:

the modest affinity of the actinide (III) species Am(III) and Cm(III) for extractants, because An(III) are stable species in high activity raffinates resulting from the performance of the PUREX process, in the stronger competition of nitric acid present in these effluents at high concentrations between 3 and 4 mole/l for the extractants, in the presence of lanthanides (III) (Ln(III)) in a molar concentration approximately 50 times higher than that of actinides (III) (case of UOx fuels from light water reactors irradiated at 33 gwd/t and cooled for three years) and whose chemical properties are very similar.

Therefore, of all the difficulties encountered for defining a process for separating An(III) from high activity raffinates produced during the reprocessing of nuclear fuels according to the PUREX process, the An(III)/Ln(III) group separation is the most difficult to solve. Thus, ions of series 4f and 5f in the trivalent state have similar chemical properties making their separation particularly difficult. Thus, the known processes for extracting the actinides present in nitric aqueous reprocessing solutions, e.g. the processes described in FR-A-2 537 326 and FR-A-2 585 692 permit the extraction of actinides in an organic solvent no matter what their valency state, but with these processes the trivalent lanthanides from the fission products are also extracted in the organic solvent.

An(III)/Ln(III) group separations, following the discovery of the elements Am and Cm by Seaborg in 1945, have formed the object of much research. A review of An(III)/Ln(III) separations was recently published by K. L. Nash in "Separation chemistry for lanthanides and trivalent actinides in Handbook on the Physics and Chemistry of Rare Earths, vol. 18: Lanthanides/Actinides: Chemistry, K. A. Gschneidner Jr., L. Eyring, G. R. Choppin and G. H. Lander, North Holland, 1994.

We will now briefly describe the most important processes and which have been tests on real solutions, or which have high An(III)/Ln(III) separation factors.

The TRAMEX process is based on the selective extraction of An(III) in the form of hexachloro complexes by an extractant constituted by a quaternary ammonium or tertiary amine salt. Variants to this process consist of the extraction of thiocyanate complexes ($SCN^-$) from An(III) either by extractants identical to those referred to hereinbefore, or by solvating extractants, neutral organophosphorus compounds such as phosphonates, phosphine oxides or carbamoyl methyl phosphine oxides.

In all cases, even though good separations are obtained when carrying out the separation in the most appropriate sense, i.e. on extracting the An(III), such processes are difficult to implement in practice, because they are the sources of abundant secondary waste as a result of the saline solutions used, namely LiCl at a concentration of 11 mole/l in the case of the TRAMEX process, or containing high concentrations of SCN⁻ ions, or the presence of the phosphorus atom in certain of the extractants used, particularly neutral organophosphorus compounds.

The TALSPEAK process is based on the selective extraction of Ln(III) by di-2-ethyl hexyl phosphoric acid (HDEHP), the An(III) being selectively complexed in aqueous solution with the aid of diethylene triaminopentaacetic acid (DTPA). The aqueous solution also contains either lactic acid, or glycolic acid. A variant to the process consists of using di-2-isodecylphosphoric acid (DIDPA), as recommended by Kubota in "Proceedings of the Global '95 Conference", Versailles (France), Sep. 11–14, 1995, vol. 1, p 110.

Although this is the process which has been the most researched and used, it suffers from the following disadvantages:

it operates in reverse to what appears most appropriate, i.e. by the selective extraction of Ln(III), it requires the adjustment of the pH of the solutions to be treated, the extractant is an organophosphorus compound, which produces secondary solid waste.

The processes based on the use of extractants having "soft" donor atoms have also been greatly studied, but have hitherto been little tested on real solutions. Among these systems, reference can be made to the following:

Systems with an organic acid with a sulphur donor atom, such as phosphorodithio acids, as described by C. MUSIKAS, G. LE MAROIS, R. FITOUSSI and C. CUILLERDIER "Properties and uses of nitrogen and sulfur donor ligands in actinide separations" Actinide separations, ACS Symposium series, vol. 117, 1980, J. D. Navratil and W. W. Schulz (American Chemical Soceity, Washington D.C.), p 131, or phosphinoditio acids, e.g. Cyanex 301$^{(R)}$, which is bis(2,4,4-trimethyl pentyl) dithiophosphinic acid, as recommended recently by Y. Zhu, in the document "The separation of Americium from light lanthanides by Cyanex 301 extraction", Radiochimica Acta, 68, 95–98, 1995.

Systems having neutral nitrogen donor extractants, such as o-phenanthroline or TPTZ, i.e. 2,4,6-tris(2,-pyridyl)-1,3,5-triazine, which must be used in a synergistic mixture with a lipophilic anion source acid extractant necessary for the transfer of the An(III) into the organic phase, in view of the weakness of the interactions of nitrogen extractants with An(III). Such systems have been described by Musikas in "Actinide-lanthanide group separation using sulfur and nitrogen donor extractants in Actinide/Lanthanide separations", Proc. Int. Symp., Honolulu, 16–22 Dec., 1984, G. R. Choppin, J. D. Navratil and W. W. Schulz (World Scientific, Singapore), p 19.

Systems based on a synergistic combination of sulphur donor atom acid extractant and nitrogen donor atom neutral extractant, such as the systems described by Jarvinen.

All these systems, based on the use of extractants with "soft" donor atoms permit the An(III)/Ln(III) group separations by selective An(III) extraction, which is satisfactory.

The An(III)/Ln(III) separation factors obtained are sometimes excellent and are e.g. close to 1000 in the case of Cyanex 301$^{(R)}$, as described by Zhu. However, these systems do not respect most of the other criteria disclosed hereinafter, which makes them relatively unsuitable for industrial use.

In concluding this study of the prior art, no process published in the literature is able to satisfy all the requirements given hereinafter and which would appear to be necessary for a An(III)/Ln(III) separation process.

These requirements are inter alia described below.

1. Secondary solid waste must not be produced. This criterion would appear to be essential. In order to achieve this objective, it is necessary to respect the principle known as the "CHON" principle, which states that all the reagents, i.e. extractants, diluents, complexing agents soluble in the aqueous phase, must be solely constituted by carbon, hydrogen, oxygen and nitrogen atoms, which gives them the property of being totally degradable into gases which can be discharged into the environment at the end of their use in the separation process. This avoids the production of secondary solid waste.

2. The separation must take place by the selective extraction of An(III), minor constituents of the An(III)/Ln(III) mixture. This would make it possible to have more "compact" processes, because in particular the solvent volume required for the extraction would be minimized.

3. It is desirable to carry out the An(III)/Ln(III) separation on the basis of a strong acid solution with a concentration at least exceeding 0.05 mole/l. These conditions would allow acidity adjustments, which could easily be industrially performed. Thus, it is necessary to avoid having to adjust the pH of a solution to be treated, because this is very difficult to carry out industrially because, without a buffer the pH is difficult to adjust and stabilize for large volumes, and with a buffer supplementary waste is produced and must be treated.

The aim of the present invention is therefore to supply a process for the selective separation of actinides(III) and lanthanides(III) using improved An(III)/Ln(III) separation media or systems satisfying all the criteria defined hereinbefore, which eliminate the disadvantages encountered with the aforementioned prior art processes and which surmount the difficulties indicated hereinbefore for this separation.

This and other aims are achieved according to the invention by a process for he selectiveseparation of actinides and lanthanides present in a reaction medium and which is characterized in that said reaction medium is an aqueous medium containing pertechnetate ions.

According to the invention, said reaction medium is contacted with an organic solvent containing an extractant preferably in solution in a diluent.

The novel reaction media or An(III)/Ln(III) separation systems supplied by he present invention satisfy all the aforementioned requirements do not suffer from the disadvantages of the prior art processes an surmount the difficulties which have hitherto prevented such separation.

The fundamental principle on which the invention is based consequently consists of the use of a pertechnetic acid $HTcO_4$ or another compound giving pertechnetate ions as the reaction medium containing the trivalent An(III)/Ln(III) metals to be separated.

Such a specific reaction medium containing pertechnetic acid is neither mentioned, nor suggested in the prior art.

Pertechnetic acid is a strong acid completely dissociated in aqueous solution and the $TcO_4^-$ anion is much more lipophilic than most other strong inorganic acid anions and in particular nitric acid generally used in fuel reprocessing operations.

Thus, according to the invention, the separation by selective extraction of An(III) consists of the extraction of An(III) pertechnetates by extractants, preferably neutral extractants incorporating either solely nitrogen donor atoms, or nitrogen and oxygen donor atoms.

In all cases, the selectivity of the separation expressed by the separation factor SF is ensured by the interaction between the An(III) ions and the nitrogen atoms of the neutral extractants, whilst the affinity for the solvent, i.e. the value of the distribution coefficient $D_{An(III)}$ of the An(III) is mainly ensured by the use of the $TcO_4^-$ anions according to the invention.

As pertechnetate anions are not of a complexing nature, the compounds formed will not be complexes as in the prior art, but instead pairs of ions, so that it is possible to increase the distribution coefficient $D_{An(III)}$ by preferably using a dissociating solvent (diluent), i.e. having a high dielectric constant.

The non-complexing character of the pertechnetate ions also allows an easier access of the extractant molecules to the An(III) metal ions and therefore the linking of a larger number thereof, which leads to selectivity gains.

As a result of the very significant increase of the affinity of the neutral extractants for An(III) mentioned hereinbefore, due to the use of $TcO_4^-$ ions, the generally very severe competition effect of extraction of strong acid from the medium is very greatly reduced, allowing the use of acid solutions for performing An(III)/Ln(III) separations.

The extraction reaction of An(III) ions is written as follows:

$$M^{3+} + 3\ TcO_4^- + n\ \overline{E} <=> \overline{ME_n^{3+}(TcO_4^-)_3}$$

the extractant E preferably being in solution in a dissociating diluent.

The pertechnetate ions are generally added to the reaction medium in pertechnetic acid form, but they can also be introduced in the form of a pertechnetate salt such as ammonium pertechnetate $NH_4TcO_4$.

They can be obtained from the PUREX process and consequently their use in An(III)/Ln(III) separation corresponds to a technetium reflux.

The quantity of pertechnetate ions present in the reaction medium is more particularly dependent on the actinide quantities to be extracted. Generally, the pertechnetate ion concentration of the aqueous medium is 0.01 to 0.5 mole/l, preferably 0.05 to 0.2 mole/l.

According to the invention, surprisingly and contrary to the case of using nitric solutions, it is possible to perform the selective extraction of An(III)-trivalent actinides from strong acid solutions, namely pertechnetic acid with an acidity generally exceeding 0.05 mole/l and in accordance with one of the objectives to be achieved, free from salting out salt.

According to the invention, the aqueous medium containing the lanthanides, the actinides and the pertechnetate ions is contacted with an organic solvent incorporating an extractant or extracting agent, preferably in solution in a diluent, by means of which a selective extraction takes place of the actinides and an organic actinide-rich extraction phase and an aqueous, lanthanide-rich phase are obtained.

As stated hereinbefore, these extractants are preferably neutral extractants containing either solely nitrogen donor atoms, or nitrogen and oxygen donor atoms.

These extractants can e.g. be chosen from among lipophilic TPTZ and picolinamides and their derivatives, the preferred extractants being picolinamides and their derivatives.

The picolinamides used are neutral extractants complying with the following general formula:

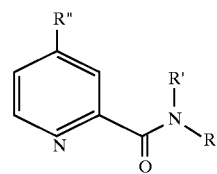

(II)

in which R, R' and R", which can be the same or different, represent a hydrogen atom or a straight or branched alkyl radical having 1 to 15 carbon atoms (e.g. 6 to 10C) or a radical producing a hydrophobic/lipophilic nature and respecting the CHON principle, i.e. constituted solely of atoms chosen from among carbon, hydrogen, nitrogen and oxygen atoms.

Preferably, R and R' represent a hydrogen atom or a 1 to 15C alkyl radical (e.g. 6 to 10C). For substituted picolinamides, preferably the total number of carbon atoms of the substituent or substituents exceeds or is equal to 6 and R or R' or R and R' are hydrogen atoms. It is also preferable for the R" to be branched.

The distribution coefficient $D_{AN(III)}$ could be optimized by modifying the picolinamide formula, particularly the nature of the substituents R, R' and R". Preferably, the extractant is made hydrophobic by the substitution of one or more hydrogens representing R, R' and R" by alkyl radicals, e.g. hexyl or dibutyl methyl radicals.

The preferred picolinamides are dibutyl methyl picolinamide (DBMPC) and N,N-dihexyl picolinamide (DHPC). As demonstrated in the work of P. Y. CORDIER, N. CONDAMINES and C. MADIC "New extractants for actinides (III)/lanthanides(III) separation: the picolinamides", 24th Actinide Conference, Obergurgl, Austria, 1994, these extractants are able to perform An(III)/Ln(III) separations from aqueous solutions containing nitrate ions. The extraction mechanism involves the formation of solvates between the An(III) nitrates and the picolinamide molecules linked with the An(III) ion by the chelating effect, via pyridine nitrogen and oxygen of the amide function.

It is obvious that the extractant can also be a mixture of two or more of the aforementioned extractants.

The organic solvent used in the invention essentially comprises, apart from the extractant or extracting agent e.g. incorporating a picolinamide of formula (II), an organic diluent e.g. chosen from among the conventional diluents of nuclear industrial chemistry such as TPH or n-dodecane or mixtures thereof.

For reasons indicated hereinbefore, preference is given to a dissociating diluent chosen from among nitrobenzene, nitriles such as benzonitrile or lauronitrile, aliphatic carbides and their mixtures, which make it possible to increase the distribution coefficient and therefore the advantageous effects obtained by the invention. The diluent can comprise a single compound or a mixture of two or more of the compounds mentioned hereinbefore.

In the diluent, the extractant concentration is generally chosen as a function of the actinide content of the aqueous solution in order to obtain a good actinide extraction rate. Generally, this concentration is 0.5 to 1.5 mole/l of solvent, preferably 0.75 to 1.25 mole/l.

Although the actinide extraction rate increases with the extracting agent concentration of the organic solvent, preference is generally given to the use of extracting agent concentrations not exceeding 1.5 mole/l.

The contacting operation can be performed once or repeated several times, e.g. 2 to 20 times.

The process according to the invention can be performed in any conventional extraction apparatus, such as mixersettler banks, exchange columns, e.g. pulsed columns, centrifugal extractors or any other apparatus suitable for contacting purposes. Generally, working takes place at ambient temperature and pressure.

It is obvious that variations to the temperature may also lead to an improvement of the distribution coefficient. There is a rise in the distribution coefficient with the temperature.

The volume ratio between the aqueous solution or medium and the organic solvent can vary within wide limits, e.g. 0.1 to 10, preferably 0.5 to 5.

The actinides selectively extracted in the organic solvent are then recovered, e.g. by deextraction with a weakly acid aqueous solution.

The lanthanides remaining in solution are then dispatched for vitrification, followed by storage.

Other features and advantages of the invention can be gathered from the study of the following illustrative and non-limitative examples.

EXAMPLE 1 (COMPARATIVE EXAMPLE)

This comparative example starts with highly saline and slightly acid aqueous solutions constituted by $LiNO_3$ at a concentration varying from 3 to 9 mole/l and nitric acid with a concentration of 0.1 mole/l containing traces, i.e. very small concentrations ($10^{-5}$ to $10^{-6}$M) of ions of the following radioelements: $^{242}$Am and $^{152}$Eu which it is wished to separate. The ions Am(III) and Eu(III) are chosen as being representatives of the two families An(III) and Ln(III).

Preparation also takes place of an organic solvent by dissolving in tetrachloroethane as the diluent, an extractant, namely dibutyl methyl picolinamide (DBMPC), which is a picolinamide made hydrophobic by the presence of the dibutyl methyl group in the 4 position on the pyridine site.

Preparation also takes place of organic DBMPC solutions titrating 1 and 1.5 mole/l in tetrachloroethane.

Contacting then takes place at ambient temperature of one volume of the thus prepared organic solvent and one volume of the aqueous solution by stirring for 5 min in a test tube and then separating the two phases by centrifuging.

Their $^{241}$Am and $^{152}$Eu contents are then measured by gamma spectrometry and the distribution coefficients $D_{Am}$ and $D_{Eu}$, which correspond to the ratio of the concentration of the radioelement (Am or Eu) in the organic solvent to the concentration of said same element (Am or Eu) in the aqueous solution. Thus, $D_{Am}$ is equal to:

$$D_{Am}=[Am]org/[Am]aq$$

Determination also takes place of the separation factor SF(Am/Eu) which corresponds to the ratio $D_{Am}/D_{Eu}$.

The results obtained are given in table 1:

TABLE 1

| DBMPC mole/l | $HNO_3$ mole/l | $LiNO_3$ mole/l | $D_{Am(III)}$ | $D_{Eu(III)}$ | $S.F._{(Am/Eu)}$ |
|---|---|---|---|---|---|
| 1 | 0.1 | 4 | 0.14 | 0.026 | 5.4 |
| 1 | 0.1 | 5 | 0.55 | 0.11 | 5 |
| 1 | 0.1 | 6 | 2.34 | 0.54 | 4.3 |
| 1 | 0.1 | 7 | 5.23 | 1.28 | 4.1 |
| 1 | 0.1 | 8 | 14.5 | 4.41 | 3.3 |
| 1 | 0.1 | 9 | 33.2 | 11.6 | 2.9 |
| 1.5 | 0.1 | 3 | 0.33 | 0.049 | 6.7 |
| 1.5 | 0.1 | 4 | 0.90 | 0.15 | 6 |
| 1.5 | 0.1 | 5 | 4.13 | 0.73 | 5.7 |

Diluent: tetrachloroethane*

TABLE 1-continued

| DBMPC mole/l | $HNO_3$ mole/l | $LiNO_3$ mole/l | $D_{Am(III)}$ | $D_{Eu(III)}$ | $S.F._{(Am/Eu)}$ |
|---|---|---|---|---|---| ambient temperature
SF (Am/Eu) = $D_{Am(III)}/D_{Eu(III)}$.
*This diluent, not complying with the CHON principle, is used solely for reasons of simplicity during the preliminary experiments.

These results give rise to the following comments:

an An(III)/Ln(III) separation is observed by selective An(III) extraction, the separation factor $SF_{Am/Eu}$ is relatively high, its value of 3 to 5 for the solution titrating 1 mole/l in DBMPC increasing with the extractant concentration rise, high distribution coefficients require the use of highly nitrate ion-concentrated solutions.

Moreover, in the presence of higher nitric acid concentrations in aqueous solution, the affinity of the extractant for Am(III) decreases and becomes virtually zero.

This information represents the following facts:

the limited affinity of picolinamide extractants for An(III) nitrates, more particularly due to the very low lipophilic nature of nitrate ions;

the very marked competition of the nitric acid extraction compared with that of An(III) nitrates, due to the relatively basic character of pyridine nitrogen.

The data appearing in this comparative example clearly show the difficulties encountered in defining An(III)/Ln(III) separations and which have been surmounted by using the process according to the present invention.

The following examples 2 to 5 illustrate the An(III)/Ln(III) separation process according to the invention, using aqueous solutions of pertechnetate ions or perrhenate ions and containing An(III) and Ln(III) ions to be separated, with the aid of picolinamide extractants, namely DBMPC or N-N-dihexyl picolinamide (DHPC), which is a picolinamide made hydrophobic by substituting hydrogens of the amide function by hexyl radicals (i.e. in formula II, R and R', each representing a hexyl radical).

EXAMPLE 2

In this example according to the invention, the starting products are aqueous solutions of perrhenate ions prepared from perrhenic acid making it possible to bring about an excellent simulation of pertechnetate ions, at concentrations varying from 0.1 to 0.5 mole/l. The aqueous solutions contain traces, i.e. very small concentrations ($10^{-5}$ to $10^{-6}$M) of ions of the radioelements $^{241}$Am and $^{152}$Eu, which it is wished to separate. The Am(III) and Eu(III) ions are chosen as being representative of the two families An(III) and Ln(III).

Preparation also takes place of an organic solvent by dissolving an extractant, namely the aforementioned DBMPC, in nitrobenzene as the diluent.

Thus, organic solutions of DBMPC titrating 1 and 1.4 mole/l in nitrobenzene are prepared.

Contacting then takes place at ambient temperature, i.e. at 25° C., of 1 volume of the organic solvent and 1 volume of the aqueous solution by stirring for 5 min in a test tube, followed by the separation of the two phases by centrifuging.

The measurement of the respective contents of each of the phases of $^{241}$Am and $^{152}$Eu takes place in the same way as in example 1. The distribution factors $D_{Am}$ and $D_{Eu}$ and the separation factor SF are also determined in the same way as in example 1. The results obtained are given in table 2.

TABLE 2

| DBMPC mole/l | HReO$_{4ini.}$ mole/l | HReO$_{4final}$ | D$_{Am(III)}$ | D$_{Eu(III)}$ | SF$_{(Am/Eu)}$ |
|---|---|---|---|---|---|
| 1 | 0.1 | 0.035 | 0.15 | 0.010 | 15 |
| 1 | 0.2 | 0.071 | 0.26 | 0.017 | 15.3 |
| 1 | 0.3 | 0.11 | 0.27 | 0.018 | 15 |
| 1 | 0.4 | 0.134 | 0.2 | 0.014 | 14.3 |
| 1 | 0.5 | 0.177 | 0.17 | 0.012 | 14.2 |
| 1.4 | 0.1 | 0.026 | 0.36 | 0.027 | 13.3 |
| 1.4 | 0.2 | 0.049 | 0.84 | 0.057 | 14.7 |
| 1.4 | 0.3 | 0.074 | 1.12 | 0.078 | 14.4 |
| 1.4 | 0.4 | 0.104 | 1.08 | 0.072 | 15 |

Diluent: nitrobenzene
ambient temperature
SF (Am/Eu) = D$_{Am(III)}$/D$_{Eu(III)}$

EXAMPLE 3

This example, according to the invention, starts with aqueous solutions of perrhenate ions prepared from perrhenic acid at concentrations varying from 0.1 to 1 mole/l and containing traces, i.e. very small concentrations ($10^{-5}$ to $10^{-6}$M) of ions of radioelements $^{241}$Am and $^{152}$Eu, which it is wished to separate. Preparation also takes place of an organic DHPC solution titrating 1 mole/l in nitrobenzene as the diluent.

Contacting then takes place at ambient temperature of 1 volume of organic solvent and 1 volume of aqueous solution, contacting and separation taking place under the conditions of example 2.

The measurement of the respective contents of each of the phases of $^{241}$Am and $^{152}$Eu and the determinations of the distribution coefficients and separation factor SF are also performed as in example 2. The results obtained are given in table 3.

TABLE 3

| DHPC | HReO$_{4ini.}$ | HReO$_{4final}$ | D$_{Am(III)}$ | D$_{Eu(III)}$ | SF$_{(Am/Eu)}$ |
|---|---|---|---|---|---|
| 1 | 0.1 | 0.030 | 0.018 | 0.001 | 18 |
| 1 | 0.2 | 0.061 | 0.021 | 0.009 | 23 |
| 1 | 0.3 | 0.072 | 0.026 | 0.009 | 28 |
| 1 | 0.4 | 0.096 | 0.029 | 0.0012 | 24 |
| 1 | 0.5 | 0.13 | 0.028 | 0.0016 | 17.5 |
| 1 | 0.6 | 0.17 | 0.024 | 0.0013 | 18.5 |
| 1 | 0.7 | 0.19 | 0.018 | 0.0012 | 15 |
| 1 | 0.8 | 0.24 | 0.015 | 0.0011 | 13.6 |
| 1 | 0.9 | 0.3 | 0.011 | 0.0012 | 9.2 |
| 1 | 1 | 0.32 | 0.008 | 0.0010 | 8 |

Diluent: nitrobenzene
ambient temperature
SF (Am/Eu) = D$_{Am(III)}$/D$_{Eu(III)}$

EXAMPLE 4

This example, according to the invention, starts with aqueous solutions of pertechnetate ions prepared from ammonium pertechnetate, at concentrations ranging from 0.005 to 0.02 mole/l and containing traces, i.e. very small concentrations ($10^{-5}$ to $10^{-6}$M) of ions of radioelements $^{241}$Am and $^{152}$Eu, which it is wished to separate.

Preparation also takes place of an organic DBMPC solution titrating 1 mole/l in nitrobenzene as the diluent.

The contacting, separation, measurement of the respective contents of each of the phases $^{241}$Am and $^{152}$Eu and the determination of the distribution coefficients and separation factor take place as in the preceding examples. The results obtained are given in table 4.

TABLE 4

| DBMPC mole/l | NH4TcO$_{4iii.}$ mole/l | D$_{Am(III)}$ | D$_{Eu(III)}$ | SF$_{Am/Eu}$ |
|---|---|---|---|---|
| 1 | 0.005 | 0.0031 | 0.0011 | 3.1 |
| 1 | 0.01 | 0.12 | 0.031 | 3.9 |
| 1 | 0.015 | 0.87 | 0.18 | 4.8 |
| 1 | 0.02 | 2.1 | 0.35 | 6 |

Diluent: nitrobenzene
ambient temperature
SF (Am/Eu) = D$_{(Am(III)}$/D$_{Eu(III)}$

EXAMPLE 5

In this example, according to the invention, the starting products are aqueous pertechnetate ion solutions prepared from pertechnetic acid, at concentrations ranging from 0.1 to 0.2 mole/l and containing traces of ions of radioelements $^{241}$Am and $^{152}$Eu, which it is wished to separate.

Preparation also takes place of organic DBMPC solutions respectively titrating 1 and 1.5 mole/l in nitrobenzene as the diluent.

Contacting, separation, measurement of the respective contents of each of the phases of $^{241}$Am and $^{152}$Eu and the determination of the distribution coefficient and separation factor take place in the same way as in the previous examples. The results obtained are given in the following table 5.

TABLE 5

| DBMPC mole/l | HTcO$_{4ini.}$ mole/l | HTcO$_{4final}$ mole/l | D$_{Am(III)}$ | D$_{Eu(III)}$ | SF$_{(Am/Eu)}$ |
|---|---|---|---|---|---|
| 1 | 0.1 | / | 0.15 | 0.001 | 15 |
| 1 | 0.125 | 0.032 | 0.17 | 0.01 | 17 |
| 1 | 0.15 | 0.051 | 0.28 | 0.017 | 16.5 |
| 1 | 0.175 | 0.077 | 0.29 | 0.016 | 18.1 |
| 1 | 0.2 | 0.098 | 0.32 | 0.017 | 18.8 |
| 1.5 | 0.125 | 0.022 | 0.16 | 0.0099 | 16.2 |
| 1.5 | 0.15 | 0.039 | 0.72 | 0.043 | 16.7 |
| 1.5 | 0.175 | 0.054 | 1.05 | 0.063 | 16.7 |
| 1.5 | 0.2 | 0.075 | 0.97 | 0.060 | 16.2 |

Diluent: nitrobenzene
ambient temperature
SF (Am/Eu) = D$_{Am(III)}$/D$_{Eu(III)}$ All these results show the highly beneficial effect of using an aqueous medium containing pertechnetate solutions according to the invention for An(III)/Ln(III) separations. The substitution of the nitrate ions by pertechnetate ions surprisingly has the following effects:

A very great increase in the affinity of picolinamide extractants for M(III) metal ions, which is demonstrated by the low concentration of pertechnetate ions (or the perrhenate ion) for obtaining high D$_{M(III)}$ values compared with that required for nitrate ions.

This increase in the extractant affinity for M(III) also induces a reduction of the competition effect due to the parasitic extraction of acid. Consequently, contrary to what happens when using nitric solutions, it is possible to carry out the selective extraction of An(III) from strong acid solutions, namely pertechnetic acid with an acidity higher than 0.05 mole/l and free from salting out salt, which was one of the aims to be achieved.

A very significant increase (approximately by a factor of 3) of the separation factor close to 15 to 20. This results from the fact that a much larger number of extractant molecules are linked with the M(III) ion than when using the nitrate medium.

We claim:

1. Process for the selective separation of actinides and trivalent lanthanides in a reaction medium, comprising the steps of disposing said actinides and trivalent lanthanides in an aqueous reaction medium containing pertechnetate ions, contacting said aqueous medium with an organic solvent including an extracting agent and separating an organic actinide-rich extraction phase and an aqueous lanthanide-rich phase.

2. Process according to claim 1, wherein the pertechnetate ions are present in a concentration of 0.01 to 0.5 mole/l.

3. Process according to claim 1, wherein the pertechnetate ions are supplied in the form of ammonium pertechnetate or pertechnetic acid.

4. Process according to claim 3, wherein the extracting agent is a neutral extractant incorporating either solely nitrogen donor atoms, or nitrogen and oxygen donor atoms.

5. Process according to claim 4, wherein the extracting agent is selected from a group consisting of lipophilic 2,4,6-tris(2-pyridyl)-1,3,5-triazine (TPTZ), picolinamides and their derivatives.

6. Process according to claim 5, wherein the picolinamides comply with the following formula:

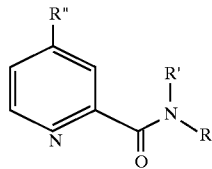

(II)

in which R, R' and R", which can be the same or different, represent a hydrogen atom or a straight or branched alkyl radical having 1 to 15 carbon atoms or a radical producing a hydrophobic/lipophilic nature and respecting the CHON principle, constituted solely by atoms chosen from among carbon, hydrogen, nitrogen and oxygen atoms.

7. Process according to claim 6, wherein the picolinamide is selected from a group consisting of dibutyl methyl picolinamide (DBMPC) and N-N-dihexyl picolinamide (DHPC).

8. Process according to claim 1, wherein the organic solvent also incorporates an organic diluent selected from a group consisting of nitrobenzen, nitriles, aliphatic carbides and their mixtures.

9. Process according to claim 1, wherein the extractant concentration is 0.5 to 1.5 mole/l of solvent.

10. Process according to claim 1, wherein the volume ratio between the aqueous medium and the organic solvent is 0.1 to 10.

* * * * *